United States Patent [19]
Stork et al.

[11] Patent Number: 6,104,380
[45] Date of Patent: *Aug. 15, 2000

[54] DIRECT POINTING APPARATUS FOR DIGITAL DISPLAYS

[75] Inventors: David G. Stork, Stanford; Gregory J. Wolff, Mountain View, both of Calif.

[73] Assignees: Ricoh Company, LTD., Tokyo, Japan; Ricoh Corporation, West Caldwell, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/840,552

[22] Filed: Apr. 14, 1997

[51] Int. Cl.⁷ .................................................. G09G 5/08
[52] U.S. Cl. .......................... 345/158; 345/157; 345/156; 345/158; 345/302
[58] Field of Search .................................... 345/158, 157, 345/302, 156, 163; 340/710; 364/514

[56] References Cited

U.S. PATENT DOCUMENTS

| | | | |
|---|---|---|---|
| 4,578,674 | 3/1986 | Baker et al. | 340/710 |
| 4,654,648 | 3/1987 | Herrington et al. | 340/710 |
| 4,688,933 | 8/1987 | Lapeyre | 356/3.16 |
| 4,754,268 | 6/1988 | Mori | 340/710 |
| 5,375,068 | 12/1994 | Palmer et al. | 364/514 |
| 5,440,326 | 8/1995 | Quinn | 345/156 |
| 5,453,758 | 9/1995 | Sato | 345/158 |
| 5,469,193 | 11/1995 | Giobbi et al. | 345/158 |
| 5,517,579 | 5/1996 | Baron et al. | 382/187 |
| 5,703,623 | 12/1997 | Hall et al. | 345/157 |
| 5,748,186 | 5/1998 | Raman | 345/302 |
| 5,825,350 | 10/1998 | Case, Jr. et al. | 345/163 |
| 5,835,078 | 10/1998 | Arita et al. | 345/158 |
| 5,926,168 | 7/1999 | Fan | 345/158 |
| 5,963,145 | 10/1999 | Escobosa | 340/825 |

FOREIGN PATENT DOCUMENTS

| | | |
|---|---|---|
| 0 526 015 A1 | 7/1992 | European Pat. Off. . |
| 0 686 935 A1 | 9/1995 | European Pat. Off. . |
| 0 756 240 A2 | 7/1996 | European Pat. Off. . |
| 44 42 107 AQ | 11/1994 | Germany . |
| 9409447 | 4/1994 | WIPO .............................. G06K 9/00 |
| 9418663 | 8/1994 | WIPO .............................. G09G 3/02 |
| 9521436 | 8/1995 | WIPO .............................. G09G 3/02 |
| 9603737 | 2/1996 | WIPO .............................. G09G 5/00 |
| 9614633 | 5/1996 | WIPO .............................. G09G 5/08 |
| 97/09837 A1 | 3/1997 | WIPO . |

OTHER PUBLICATIONS

"Wireless Pointing Device," IBM Technical Disclosure Bulletin, Jun. 1993, pp. 345–346.
Priority Document, Reference No. 146123, in 10 pgs.
Priority Document, Reference No. 22364, in 12 pgs.
Priority Document, Reference No. 200142, in 6 pgs.
Priority Document, Reference No. 23355, in 12 pgs.

*Primary Examiner*—William A. Cuchlinski, Jr.
*Assistant Examiner*—Marthe Y. Marc-Coleman
*Attorney, Agent, or Firm*—Blakely, Sokoloff, Taylor & Zafman LLP

[57] ABSTRACT

An apparatus for presenting on-line documents is provided. The device is coupled to and for use with a network providing access to interconnected, on-line documents in response to document requests. The device comprises a cursor control device and at least one position sensor, wherein the position sensor determines a location of the cursor control device. The at least one position sensor is coupled to a display device. The display device displays a cursor that is responsive to the cursor control device. The display device displays on-line documents in response to document requests made via the cursor.

21 Claims, 4 Drawing Sheets

DIRECT POINTING APPARATUS FOR DIGITAL DISPLAYS

FIELD OF THE INVENTION

The present invention relates to making presentation over a network, and more specifically, to a method and apparatus for displaying a presentation accessed from a network.

BACKGROUND OF THE INVENTION

Today, computer systems typically use some sort of cursor displayed on a screen to enable the user to select commands or perform other input functions. Currently, cursor control is accomplished through relative motion devices, such as mouses, or direct contact of the display, such as with a touch screen. Relative motion devices control cursor motion. However, the movement of the cursor is not equal to the movement of the relative motion device. A direct control device allows inputs to be made by physically touching a location of the screen. Both of these types of cursor control have a physical interface to a computer. However, these relative motion devices are too limiting. Therefore, it would be desirable to provide a cursor control device having no physical interface to the system.

In the course of business, these presentations are often performed for a variety of purposes. Often, presentations are performed by individuals using overhead projections of images, graphs, charts, etc. Recently, more sophisticated businesses and scientific presentations have included interactive multi-media and color. Software, such as Microsoft PowerPoint™, for example, and hardware are becoming more common for such presentations. In fact, currently, portable laptop computers may be connected to digital display screens on overhead projectors.

One problem with the interactive and multi-media presentation is the hardware may be bulky, which may hinder an individual or limit that amount of material that an individual may bring to a presentation. It is desirable to reduce the amount of hardware necessary to support such presentations.

One goal of a presentation is to provide accurate, up-to-date information. Sources of this type of information include networks and distributed databases, such as digital libraries, data jukeboxes, servers and the World Wide Web (the Web).

Currently, the largest computer network in existence is the Internet. The Internet is a worldwide interconnection of computer networks that communicate using a common protocol. Millions of computers, from low end personal computers to high-end super computers are coupled to the Internet.

In 1989, a new type of information system known as the World Wide Web (the Web) was introduced to the Internet. Early development of the Web took place at CERN, the European Particle Physics Laboratory. The Web is a wide-area hypermedia information retrieval system that gives wide access to a large universe of documents. Initially, the Web was only known to and used by the academic/research community because there was no easily available tool which allows a technically untrained person to access the Web.

In 1993, the National Center for Supercomputing Applications (NSCA) released a Web browser called "Mosiac" that implemented a graphical user interface (GUI). Mosiac's GUI was simple to learn yet powerful and allowed users to retrieve documents from the Web using simple point-and-click commands. Because the user does not have to be technically trained and the browser is easy to use, Web browsers have the potential of opening the Internet to the masses.

The architecture of the Web follows a conventional client-server model. The terms "client" and "server" are used to refer to a computer's general role as a requester of data (the client) or provider of data (the server). In the Web environment, Web browsers reside in clients and Web documents reside in servers. Web clients and Web servers communicate using a protocol called "HyperText Transfer Protocol" (HTTP). A browser, such as Mosaic opens a connection to a server and initiates a request for a document. The server delivers the requested document, typically in the form of a text document coded in a standard HyperText Markup Language (HTML) format.

Portions of documents displayed on the Web typically contain hypertext links that link graphics or text in one document with another document on the Web. Documents containing hypertext links are created prior to their "publishing" on the Web. That is, a document that is to be published is provided to a server which creates the document and, essentially, publishes the document by permitting its access by others on the Web. Each hypertext link is associated with a Universal Resource Locator (URL) that identifies and locates a document on the Web. When a user selects a hypertext link, using, for instance, a cursor, the graphical browser retrieves the corresponding document(s) using a URL(s).

The present invention provides for a pointing device that controls the cursor on a display based on the absolute positioning of the cursor control device with respect to the screen. The pointing device of the present invention may be used to access and display documents such as those retrieved from the Web and which may be part of the presentation.

As the trend towards high quality, multi-media productions continues to grow, people may desire to have access to networks, including uses of such academic documents for use in the presentations. The present invention provides such access. As will be described below, the present invention provides an apparatus for making presentations of on-line documents.

SUMMARY OF THE INVENTION

A system is described. The system comprises a cursor control device and a display device to display a cursor on a portion thereof based on the absolute positioning of the cursor control device with respect to display.

In one embodiment, the display device projects on-line documents in response to document requests made via the cursor selections.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
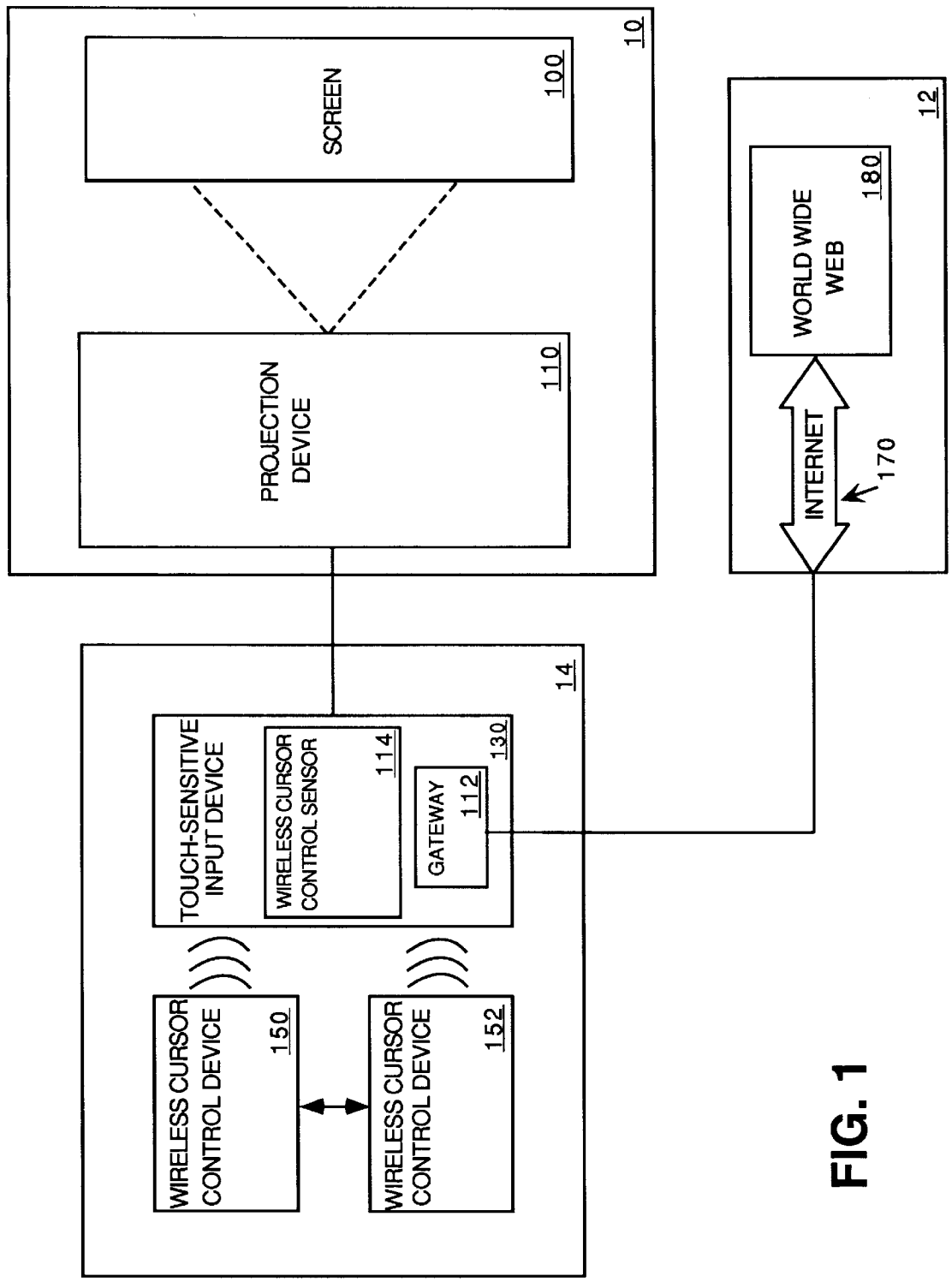
FIG. 1 is a block diagram of one embodiment of a presentation apparatus of the present invention in relation to a network.

A direct pointing device for controlling cursor movement on a display that is not physically interfaced to the pointing device is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid obscuring the present invention.

The present invention provides a direct pointing apparatus for use with digital displays without having a physical interface to the display (or the system that drives the display). In one embodiment, the direct pointing apparatus controls a cursor on a display. That is, the direct pointing apparatus operates as a cursor control device that permits sending input to the system without having a physical interface thereto.

Without a physical interface, the control of the cursor is based on the absolute position of the direct pointing apparatus with respect to the display. The present invention uses sensors to determine the absolute position of the direct pointing device and associating absolute coordinates for the position of the pointing device with respect to the display, which may be projected onto a screen or other viewing area. Gyroscopes and/or focus adjustments may be used for such purposes.

Control logic transforms sensor data into global coordinates for positioning the cursor properly on the projected image. Note that in one embodiment, the coordinate systems of both the pointing device and the display are transformed into a common coordinate system. In an alternative embodiment, one of either the pointing device or the display is transformed into the coordinate system of the other.

By tracking the position of the pointing device, any movements made by the pointing device may be tracked. Such recorded movements, in conjunction with the distance of the pointing device from the display and the intersection between the display and a line of pointing from the direct pointing apparatus to the display, may be used to properly position the cursor on the screen. Thus, by controlling the cursor based on its absolute position, each movement of the pointing device creates an absolute, as opposed to relative, movement of the display.

Such a pointing device may be used to control the display of documents accessed from a network, such as the World Wide Web (the Web), during the presentation. The present invention provides a display device coupled to a network, such as the Web, for displaying on-line documents, such as text and multimedia files, accessed from the network. Using the cursor control of the present invention, one or more individuals may control the presentation that include accessing and displaying of on-line documents.

Prior to explaining the present invention in detail, a brief explanation regarding client-server operation, URLs and browsing the Web is presented. A computer network, such as the Internet, includes many different kinds of computers that may be used as servers. In general, personal computers or workstations are the sites at which a human user operates the computer to make requests for data from other computers or servers on the network. Usually, the requested data resides in remote computers. In this specification, the terms "client" and "server" are used to refer to a computer's general role as a requester of data (client) or provider of data (server). Further, each computer may request data in one transaction and provide data in another transaction, thus changing the computer's role from client or server, or vice versa.

The Web uses the client-server model to communicate information between clients and servers. Web servers are coupled to the Internet and respond to document requests from Web clients. Web clients, via Web browsers, allow users to access Web documents located on Web servers.

An example of a client-server system interconnected through the Internet may include a remote server system interconnected through the Internet to a client system. The client system may include conventional components such as a processor, a memory (e.g., RAM), a bus which couples the processor and memory, a mass storage device (e.g., a magnetic hard disk or an optical storage disc) coupled to the processor and memory through an I/O controller and a network interface, such as a conventional modem.

An example of a URL for a Web document is:

http: //info.tech.ch/hypertext/Data/WWW/History.html
This URL indicates that by using the HTTP protocol to reach a server called "info.tech.ch", there is a directory "hypertext/Data/WWW" that contains a HTML document named "History.html".

To access an initial Web document, the user enters the URL for a Web document into a Web browser program. The Web browser then sends an HTTP request to the server that has the Web document corresponding to the URL. The Web server responds to the HTTP request by sending the requested HTTP object to the client. In most cases, the HTTP object is a plain text (ASCII) document containing text that is written in HTML. The HTML document usually contains hyperlinks to other Web documents. The Web browser displays the HTML document on the screen for the user and the hyperlinks to other Web documents are emphasized in some fashion such that the user can identify and select the hyperlinks.

FIG. 1 is a block diagram of one embodiment of a presentation apparatus of the present invention in relation to a network. Generally, display device 10 is coupled to communicate over network 12 and to receive data from cursor control device 14.

According to one embodiment, display device 10 comprises projection device 110, such as an overhead projector. An LCD projection panel or other device is used in conjunction with an overhead projector to display documents retrieved from a network. In addition, the LCD panel may also act as a touch-sensitive input device that accepts input from a user's finger, a stylus, or other such item to control a cursor. Projection device 110 projects documents accessed from a network onto screen 100 for viewing by participants in a presentation. Alternatively, display device 100 may be a monitor or other tube-based display device.

Touch-sensitive input device 130 runs a Web browser controlled by wireless cursor control device(s) and/or touch-sensitive input. Web browsers that may be used include Mosaic, Navigator™ (available from NetScape of Mountain View, Calif.), or any other interface that allows access to the Web or other network. Alternatively, projection device 110 may be coupled to a computer that runs a Web browser and/or supplies network access.

Touch-sensitive input device 130 is connected to network 12 via gateway 112, which provides access to the Web 180 via Internet 170. In one embodiment, gateway 112 is integrated into touch-sensitive input device 130 such that a cable, telephone line, or other connection is used for direct access between touch-sensitive input device 130 and the Internet 170 (via a phone jack). Thus, a user may carry the LCD projection panel and one or more wireless cursor control devices to a presentation or meeting to access on-line documents via the Web. Alternatively, gateway 112 may be remotely located such that touch-sensitive input device 130 may be coupled to a wall outlet or other interface to allow access to gateway 112, which, in turn, provides access to Internet 170.

Touch-sensitive input device 130 also includes wireless cursor control sensor 114 that receives data from wireless cursor control devices, such as wireless cursor control devices 150 and 152. Wireless cursor control sensor 114 receives data from sensors that sense the position of wireless cursor control devices to control one or more corresponding cursors shown on screen 100 via projection device 110. Wireless cursor control sensor is discussed in greater detail below with respect to FIG. 3.

Wireless cursor control sensor 114 may be implemented as a portion of touch-sensitive input device 130 or as a portion of projection device 110. Alternatively, wireless cursor control sensor 114 may be a distinct hardware element coupled to touch-sensitive input device 130.

When showing a presentation, an individual may position the cursor to select one or more hypertext links or hot buttons that are displayed on screen 100 by using touch-sensitive input device 114 or a wireless cursor control device (e.g., 150 or 152). Thus,be made by coon may be made by connecting an LCD projection panel to the Web via a phone jack or other connection and using one or more wireless cursor control devices or a touch-sensitive input device, which reduces the hardware and/or printed copies required to make the presentation.

The Web 180 includes multiple servers and machines interconnected to gateway 112 via Internet 170. With respect to the Web 180, it should be noted that the present invention is not limited to searching for and retrieving documents on the Web. The teachings of the present invention may be applied to various networks, data and document storage and archival facilities, or other types of client-server systems which have documents or other information available upon request.

Other configurations may also be used. For example, touch-sensitive input device 130 may be eliminated leaving only one or more wireless cursor control devices and wireless cursor control sensor 114 as part of an LCD projection panel. Alternatively, the wireless cursor control devices along with wireless cursor control sensor 114 may be eliminated leaving only touch-sensitive input device 130.

Figure 2:
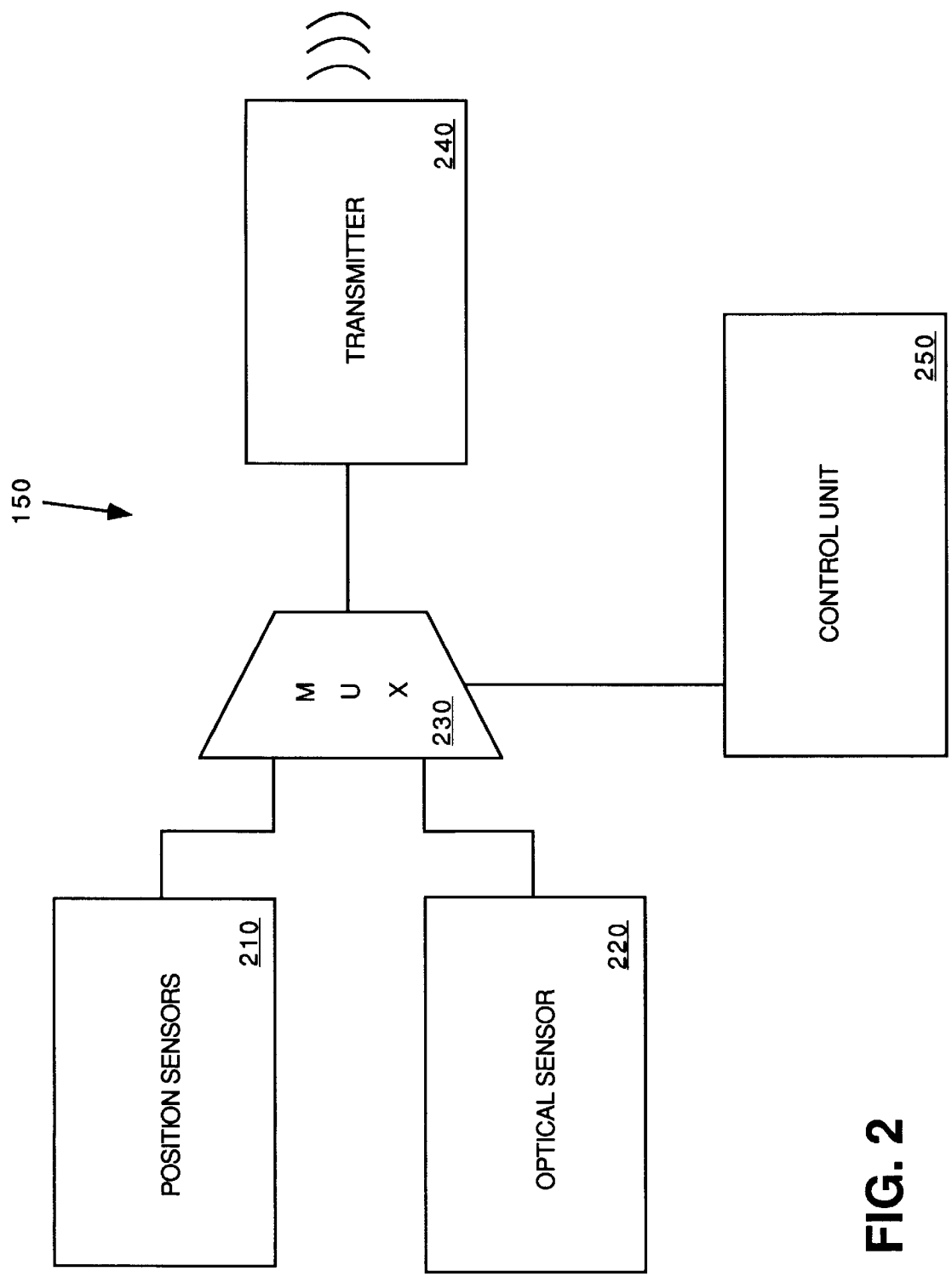
FIG. 2 is a block diagram of a wireless cursor control according to one embodiment of the present invention.

FIG. 2 is a block diagram of wireless cursor control device 150. Position sensors 210 and optical sensor 220 generate inputs to multiplexer 230. Control unit 250 controls multiplexer 230. Transmitter 240 transmits the output of multiplexer 230.

In one embodiment, wireless cursor control device 150 includes a position sensor system having a gyroscope (gyro) in which a rotating member continues to turn about a fixed spin axis as long as no forces are exerted on the member and the member is not accelerated. Gyro attitude transducers (free gyros) are used as two-degree-of-freedom gyros that can provide an output for the wireless cursor control device's three attitude planes: pitch, yaw, and roll (or x, y, and z axes). Rate gyros are attitude-rate transducers that provide an output signal proportioned to angular velocity (time rate of change of attitude). Data from the position sensors is transmitted by transmitter 240.

An alternative implementation of a position sensor system described as used in a writing instrument is disclosed in a patent application entitled "MANUAL ENTRY INTERACTIVE PAPER AND ELECTRONIC DOCUMENT HANDLING AND PROCESSING SYSTEM" filed Nov. 1, 1995, Ser. No. 08/551,535.

Wireless cursor control device 150 further includes a focus adjustment, or optical, sensor. The optical sensor determines the distance between wireless cursor control device 150 and the surface that displays the documents being viewed by the user, such as screen 100. In one embodiment, the optical sensor comprises a manual focus adjustment that is adjusted by the user. Alternatively, the optical sensor may comprise a circuit that automatically determines the distance between the cursor control device and screen 100. For example, the optical sensor may bounce light off of screen 100 to determine the distance. Any other appropriate mechanism for determining distance may also be used. Other wireless cursor control devices, such as wireless cursor control device 252 and any additional wireless cursor control devices are implemented in a similar manner.

In one embodiment, position sensors 210 and optical sensor 220 determine motion in three dimensions as well as the distance between the cursor control device 150 and the screen 100. This allows accurate determination of the intersection between the screen 100 and the "line of pointing" of the cursor control device 150. Thus, accurate cursor control may be obtained through use of a cursor control device that is not physically connected to the display device or the hardware that provides network access.

Figure 4:
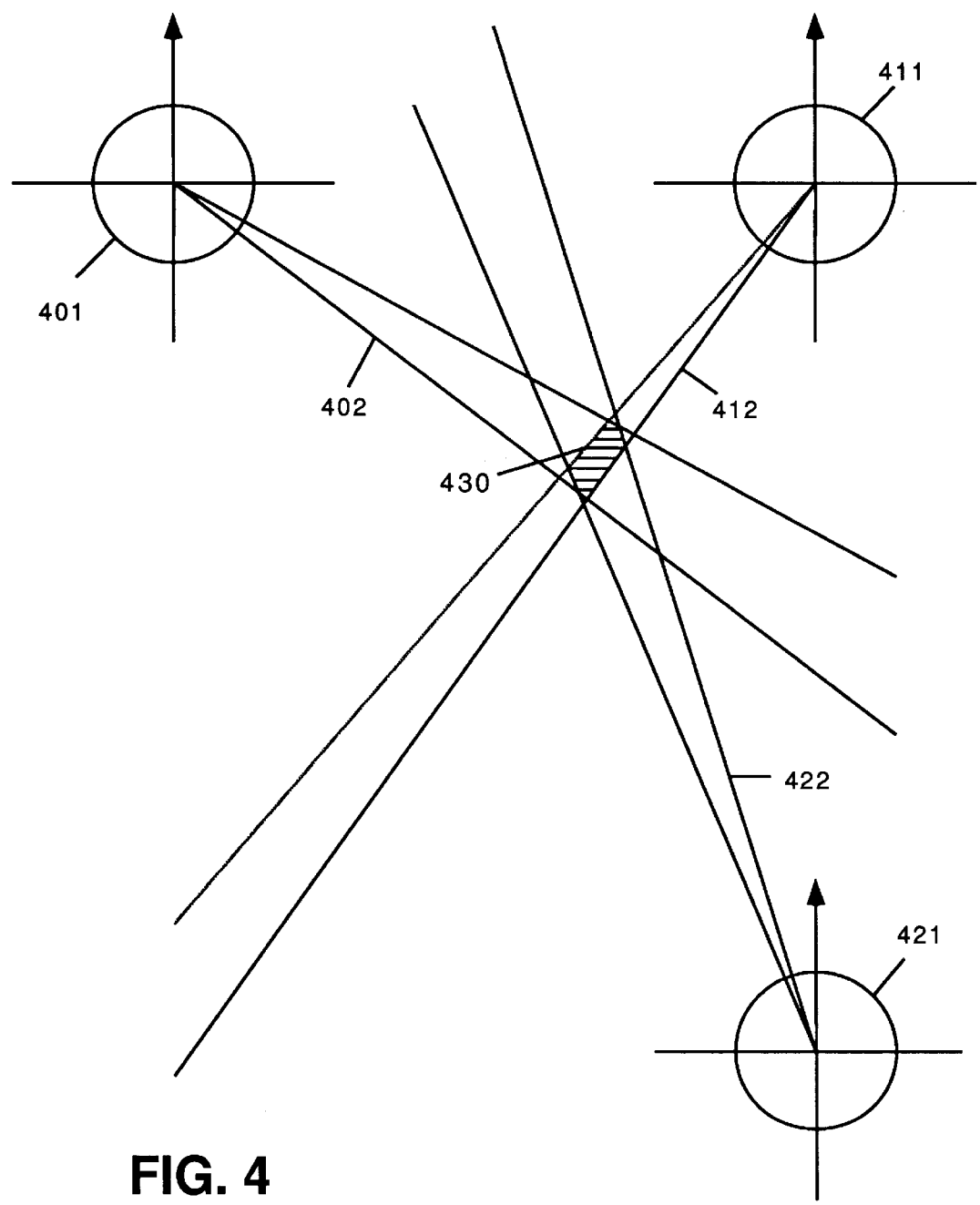
FIG. 4 is a geometry for an infrared (IR) tracking and positioning system according to one embodiment of the present invention.

Multiplexer 230 selectively couples position sensors 210 or optical sensor 220 to transmitter 240 in response to signals generated by control unit 250. Control unit 250 generates control signals to alternate the coupling of the sensors to transmitter 240 such that data from the sensors is transmitted by transmitter 240. Transmitter 240 transmits data output by multiplex 230, which is received by wireless cursor control sensor 114 (as shown in FIGS. 2 and 4) to control a cursor shown on screen 100.

Data from the position sensors and the optical sensor are transmitted to wireless cursor control sensor 114 in touch-sensitive input device 130. Wireless cursor control sensor 114 receives and processes data from the one or more wireless cursor control devices to move the cursors displayed by display device 10 associated with each cursor control device in response to movements of the wireless cursor control devices.

Figure 3:
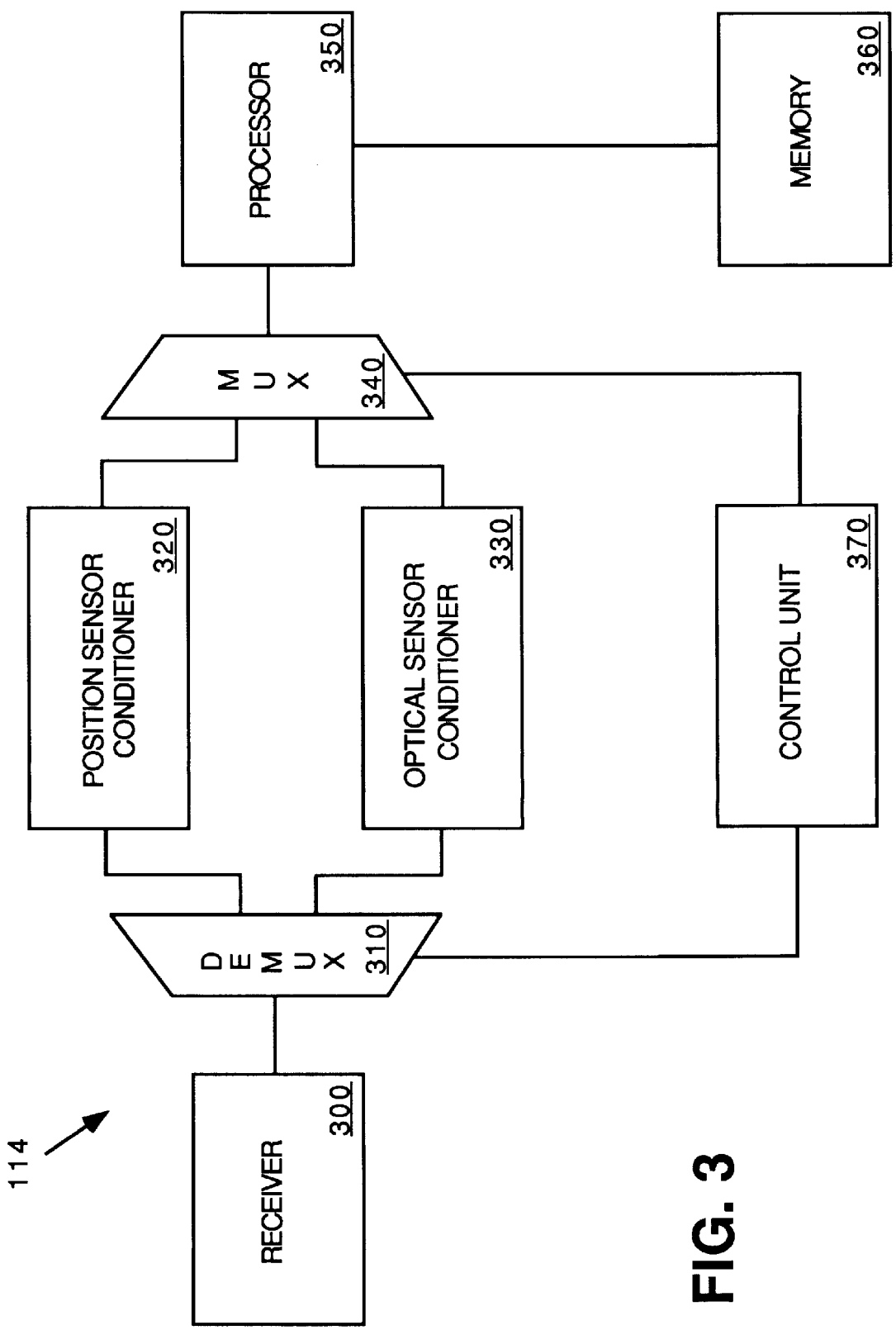
FIG. 3 is a block diagram of a wireless cursor control sensor according to one embodiment of the present invention.

Wireless cursor control sensor 114, shown in FIG. 3, generally includes receiver 300 coupled to demultiplexer 310, which channels data from receiver 300 to either position sensor conditioner 320 or optical sensor conditioner 330, in the appropriate manner. The outputs of position sensor conditioner 320 and optical sensor conditioner 330 are coupled to multiplexer 340, which selects an input to be coupled to processor 350. Control unit 370 generates signals to control demultiplexer 310 and multiplexer 340. The output of multiplexer 340 is coupled to processor 350. Memory 360 is also coupled to processor 350.

Receiver 300 receives signals from one or more wireless cursor control devices, such as wireless cursor control devices 150 and 152. Receiver 300 is selectively coupled to position sensor conditioner 320 and optical sensor conditioner 330 by demultiplexer 310, such that position sensor data is transferred to position sensor conditioner 320 and optical sensor data is transferred to optical sensor conditioner 330 at appropriate times.

The outputs of position sensor conditioner 320 and optical sensor conditioner 330 are selectively coupled to processor 350 via multiplexer 340. Processor 350 receives and processes position sensor data from position sensor conditioner 320 and optical sensor data from optical sensor conditioner 330. Processor 350 processes the data received to control cursor movements of display device 10. Processor 350 accesses memory 360 to process sensor data and control cursor movements. Wireless cursor control sensor 114 thereby controls one or more cursors on display device 10 in response to movements of wireless cursor control devices, such as wireless cursor control devices 150 and 152.

FIG. 3 is one possible embodiment; however, other embodiments are possible. For example, demultiplexer 310, position sensor conditioner 320, optical sensor conditioner 330, multiplexer 340, and control unit 370 may be a portion of receiver 300 or of processor 350. Alternatively, some of the elements may be a portion of receiver 300, while others are a portion of processor 350.

As is shown from the description above, participants in a presentation may access on-line documents by utilizing a Web browser or other network interface. A participant may, for example, access a Web page to begin a presentation and then access other on-line documents be selecting a hypertext or other link on the Web page using one of the cursor control devices discussed above. Thus, the participant may gain access to a large universe of on-line documents with reduced hardware.

FIG. 4 illustrates an alternative embodiment in which a wireless cursor control sensor 114 is equipped with an infrared (IR) detector that detects the movement of the wireless cursor control devices. In this embodiment, the wireless cursor control devices do not contain gyros or an optical sensor. The position of each wireless cursor control device is determined by a plurality of IR radiating scanning sources.

When wireless cursor control sensor 114 is equipped with an infrared detector, a multiplicity of two or more external IR radiating scanning sources located at predetermined positions can be used to track the position of the wireless cursor control device by using triangulation techniques that measure the angle at which each IR scanning source illuminates the wireless cursor control device. Alternatively, the wireless cursor control device can be equipped with an IR transmitter and two or more external scanning receivers located at prescribed positions can be used to track the position of the wireless cursor control device by triangulation. FIG. 4 shows the geometry of an IR tracking system using three external positions 401, 411, and 421. Each position has a directive scanning beam (receiving or transmitting) 402, 412, and 422 associated respectively with positions 401, 411, and 421. Shaded area, 430, represents the intersection of the beams and corresponds to the estimated position of the wireless cursor control device.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system comprising:
    a display device;
    a cursor control device having sensors to determine positioning of the cursor control device including at least one sensor to directly measure a distance between the cursor control device and the display device, the cursor control device further having a transmitter to transmit position data based output of the sensors;
    control logic having a receiver to receive the position data, the control logic coupled to the display device to display a cursor on a portion of the display device in response to the position data received from the cursor control device.

2. The system defined in claim 1 wherein the control logic transforms sensor data into global coordinates representing the position of the cursor with respect to the display.

3. The system defined in claim 1 wherein the display device displays on-line documents in response to document requests made movement of the cursor by the cursor control device.

4. The system of claim 1 wherein the at least one sensor to directly measure the distance between the cursor control device and the display device comprises an optical sensor.

5. The system of claim 1 wherein the at least one sensor to directly measure the distance between the cursor control device and the display device comprises a focus adjustment.

6. A system for presenting on-line documents from a network providing access to intercinnected, on-line documents in response to document requests, the system comprising
    a display device
    a cursor control device having position sensors to determine positioning of the cursor control device including at least one sensor to directly measure a distance between the cursor control device and the display device, the cursor control device further having a transmitter to transmit position data based on output of the position sensors;
    Wherein the display device has a receiver to receive the position data, the display device further displaying a cursor on a portion thereof, wherein the cursor is responsive to the cursor control device, the display device displaying on-line documents in response to document requests made via the cursor.

7. The system of claim 6 wherein the network is the World Wide Web.

8. The system of claim 6 wherein the on-line documents comprise World Wide Web pages.

9. The system of claim 6 wherein the document requests comprise selection of hypertext links via the cursor control device.

10. The system of claim 6 wherein the position sensors comprise:
    a plurality of gyroscopes to detect a pitch, a yaw, and a roll of the cursor control device; and
    an optical sensor to detect a distance between the cursor control device and the display device.

11. The system of claim 6 wherein the position sensors comprise:
    a plurality of gyroscopes to detect a pitch, a yaw, and a roll of the cursor control device; and
    an focus adjustment sensor to detect a distance between the cursor control device and the display device.

12. A system for presenting on-line documents, the device coupled to and for use with a network providing access to interconnected, on-line documents in response to document requests, the device comprising: cursor control means for controlling a cursor having position sensor means for determining a position of the cursor control means; and
    display means for displaying a cursor responsive to the cursor control means and on-line documents in response to document requests made via the cursors
    wherein the cursor control means include means for directly measuring a distance between the cursor control means and the display means.

13. The system of claim 12 wherein the cursor control means comprises:
    position monitoring means for monitoring a pitch, a yaw, and a roll of the cursor control means;
    optical sensor means for determining a distance between the cursor control means and the display means; and transmitter means for transmitting data from the position monitoring means and the optical sensor means.

14. A cursor control device comprising, at least one positioning sensor to determine positioning of the cursor control device;

a distance sensor to directly measure a distance between the cursor control device and a display device;

a transmitter coupled to the at least one positioning sensor and the distance sensor to transmit data describing positioning of the cursor control device and distance between the cursor control device and the display device, wherein the data transmitted is used to control a cursor displayed by the display device, and further wherein the cursor is responsive to the cursor control device.

15. The cursor control device of claim 14 wherein the at least one positioning sensor comprises gyroscopes to detect a pitch, a yaw, and a roll of the cursor control device.

16. The cursor control device of claim 14 wherein the distance sensor comprises an optical sensor to detect the distance between the cursor control device and the display device.

17. The cursor control device of claim 14 wherein the distance sensor comprises a focus adjustment to determine the distance between the cursor control device and the display device.

18. A cursor control sensor comprising:

a receiver to receive positioning data from a cursor control device, wherein the positioning data comprises positioning data and distance data, wherein the distance data describes the distance between the cursor control device and a display device based on a direct measurement made by the cursor control device;

a processor coupled to the receiver, the processor to convert the positioning data received from the cursor control device to cursor control information to control positioning of a cursor on the display device.

a display interface coupled to the control circuitry, the display interface to communicate the cursor control information to the display device.

19. The cursor control sensor of claim 18 wherein the positioning data comprises a pitch, a yaw, and a roll of the cursor control device.

20. The cursor control sensor of claim 18 wherein direct measurement is made with an optical sensor.

21. The cursor control sensor of claim 18 wherein the direct measurement is made with a focus adjustment.

* * * * *

UNITED STATES PATENT AND TRADEMARK OFFICE
CERTIFICATE OF CORRECTION

PATENT NO. : 6,104,380
DATED : August 15, 2000
INVENTOR(S) : Stork et al.

It is certified that error appears in the above-identified patent and that said Letters Patent is hereby corrected as shown below:

Column 5,
Line 19, after "Thus," delete "be made by coon" and insert -- a presentation --.

Signed and Sealed this

Eighteenth Day of September, 2001

Attest:

NICHOLAS P. GODICI
Attesting Officer  Acting Director of the United States Patent and Trademark Office